(12) United States Patent
Jacobson et al.

(10) Patent No.: US 10,817,829 B2
(45) Date of Patent: Oct. 27, 2020

(54) BLOCKCHAIN-BASED SUPPLY CHAIN SMART RECALL

(71) Applicant: Bank of America Corporation, Charlotte, NC (US)

(72) Inventors: William P. Jacobson, Matthews, NC (US); John C. Checco, Stony Point, NY (US)

(73) Assignee: Bank of America Corporation, Charlotte, NC (US)

( * ) Notice: Subject to any disclaimer, the term of this patent is extended or adjusted under 35 U.S.C. 154(b) by 292 days.

(21) Appl. No.: 15/903,186

(22) Filed: Feb. 23, 2018

(65) Prior Publication Data
US 2019/0266563 A1 Aug. 29, 2019

(51) Int. Cl.
*G06Q 10/08* (2012.01)
*H04L 9/06* (2006.01)
(Continued)

(52) U.S. Cl.
CPC ..... *G06Q 10/0837* (2013.01); *G06F 16/1815* (2019.01); *G06F 21/64* (2013.01);
(Continued)

(58) Field of Classification Search
CPC . G06Q 10/0837; G06F 16/1815; G06F 21/64; H04L 9/0637; H04L 63/0442; H04L 2209/38
See application file for complete search history.

(56) References Cited

U.S. PATENT DOCUMENTS

| 5,892,900 A | * | 4/1999 | Ginter | G06F 21/10 |
| | | | | 726/26 |
| 5,949,876 A | * | 9/1999 | Ginter | G06F 21/10 |
| | | | | 348/E5.006 |

(Continued)

OTHER PUBLICATIONS

Conoscenti et al., "Peer to Peer for Privacy and Decentralized in the Internet of Things," 2017, IEEE, pp. 288-290. (Year: 2017).

(Continued)

*Primary Examiner* — Fahd A Obeid
*Assistant Examiner* — Michael Jared Walker
(74) *Attorney, Agent, or Firm* — Weiss & Arons LLP; Michael A. Springs, Esq.

(57) ABSTRACT

A method for executing a smart recall of a plurality of manufactured units is provided. The method may include, inter alia, using a database architecture to administer a supply chain for the units, assigning each component of the units a distributed ledger (blockchain) identification (ID), and additional pieces of information such as a serial number of the component, a date of manufacture of the component, a location of manufacture of the component, an ID associated with the source of the component, and/or the ID(s) of one or more subcomponent unit(s) of the component. The assigned information is stored in the database architecture. The method may also include generating a private database supplier key and a manufacturer key. The method further includes: transmitting a notice to downstream manufacturers, transmitting a notice to a regulatory agency to implement safety procedures and/or unit and transmitting a recall notice.

23 Claims, 7 Drawing Sheets

(51) Int. Cl.
  *G06F 21/64* (2013.01)
  *H04L 29/06* (2006.01)
  *G06F 16/18* (2019.01)
(52) U.S. Cl.
  CPC ........ *H04L 9/0637* (2013.01); *H04L 63/0442* (2013.01); *H04L 2209/38* (2013.01)

(56) References Cited

U.S. PATENT DOCUMENTS

| | | | |
|---|---|---|---|
| 9,319,404 B2* | 4/2016 | Svigals | H04L 63/0861 |
| 9,436,923 B1* | 9/2016 | Sriram | H04L 9/3247 |
| 9,485,231 B1* | 11/2016 | Reese | H04L 63/02 |
| 9,565,192 B2* | 2/2017 | Chillappa | H04L 63/102 |
| 9,591,016 B1* | 3/2017 | Palmieri | H04L 63/1433 |
| 9,635,000 B1* | 4/2017 | Muftic | H04L 9/14 |
| 9,699,659 B2* | 7/2017 | Zehavi | H04W 4/70 |
| 9,699,814 B2* | 7/2017 | Zakaria | H04W 4/70 |
| 9,716,595 B1* | 7/2017 | Kravitz | H04L 9/3213 |
| 9,729,528 B2* | 8/2017 | Zakaria | H04L 63/061 |
| 9,749,297 B2* | 8/2017 | Gvili | H04L 63/0428 |
| 9,785,369 B1* | 10/2017 | Ateniese | G06F 21/53 |
| 9,794,074 B2* | 10/2017 | Toll | H04L 9/0618 |
| 9,825,921 B2 | 11/2017 | Reese | |
| 9,849,364 B2* | 12/2017 | Tran | H04L 67/12 |
| 9,875,510 B1* | 1/2018 | Kasper | G06Q 40/12 |
| 10,251,053 B1* | 4/2019 | Paczkowski | H04W 8/22 |
| 2010/0169639 A1* | 7/2010 | Jeffries | G06Q 10/10 713/153 |
| 2011/0258065 A1* | 10/2011 | Fordyce, III | G06Q 10/10 705/26.1 |
| 2013/0238471 A1* | 9/2013 | Maraz | G06Q 10/087 705/28 |
| 2016/0173495 A1* | 6/2016 | Joo | H04L 63/08 713/171 |
| 2016/0248746 A1* | 8/2016 | James | H04W 4/70 |
| 2016/0259937 A1* | 9/2016 | Ford | G06F 21/554 |
| 2016/0260095 A1* | 9/2016 | Ford | G06Q 20/401 |
| 2016/0337127 A1* | 11/2016 | Schultz | H04W 4/70 |
| 2016/0366181 A1* | 12/2016 | Smith | H04L 63/102 |
| 2017/0048209 A1* | 2/2017 | Lohe | H04L 63/0442 |
| 2017/0048235 A1* | 2/2017 | Lohe | G06Q 20/065 |
| 2017/0163444 A1* | 6/2017 | McLaughlin | H04L 69/08 |
| 2017/0180355 A1* | 6/2017 | Enns | H04L 63/062 |
| 2017/0221052 A1* | 8/2017 | Sheng | G06Q 20/3678 |
| 2017/0236104 A1* | 8/2017 | Biton | G06Q 20/065 705/64 |
| 2017/0262862 A1* | 9/2017 | Aljawhari | G06F 16/242 |
| 2017/0289184 A1* | 10/2017 | C | H04L 63/1425 |
| 2017/0352027 A1* | 12/2017 | Zhang | H04L 9/0825 |
| 2017/0364860 A1* | 12/2017 | Wilkinson | G06Q 30/0255 |
| 2018/0053182 A1* | 2/2018 | Mokhasi | H04L 63/126 |
| 2018/0253451 A1* | 9/2018 | Callan | H04L 9/3239 |
| 2019/0172566 A1* | 6/2019 | Schulman | G16H 10/65 |
| 2019/0289454 A1* | 9/2019 | Inoue | H04W 12/04071 |
| 2019/0349190 A1* | 11/2019 | Smith | G06F 16/1834 |

OTHER PUBLICATIONS

"Securing the Internet of Things: A Proposed Framework," https://www.cisco.com/c/en/us/about/security-center/secure-iot-proposed-framework.html, Mar. 16, 2016.

"Global Hacker Botnet tops 6 million hijacked devices," http://www.computerweekly.com/news/450427023/Global-hacker-botnet-tops-6-million-hijacked-devices, Sep. 27, 2017.

* cited by examiner

BLOCKCHAIN-BASED SUPPLY CHAIN SMART RECALL

FIELD OF TECHNOLOGY

Aspects of the invention relate to recalling selected items in a supply chain. More specifically, aspects of the invention relate to identifying defects and/or recalling selected Internet of Things (IoT) devices or items in a supply chain.

BACKGROUND OF THE DISCLOSURE

A supply chain may be used to manufacture components and form unit assemblies (a combination of multiple components connected or affixed into a larger unit). At the end of a supply chain, a unit assembly, referred to herein, in the alternative, simply as a unit, represents a final product.

Unfortunately, defects may appear in selected items or components in a supply chain.

It is often desirable for a manufacturer of a final product to determine which components are defective. It is further desirable for the manufacturer of the final product to target, in response to a determination of defectiveness, a recall of the product. It is yet further desirable to make sources/suppliers immediately aware of the defective parts or components.

A block chain is a distributed ledger of records which contain information.

It would be desirable to provide systems and methods for providing blockchain-based supply chain smart recall.

SUMMARY OF THE DISCLOSURE

A smart recall mechanism for triggering defect identification and/or performing a recall of a manufactured unit is provided. The unit may be formed, on a supply chain, from a plurality of components. The supply chain may be formed from a plurality of component manufacturing sources. The plurality of components may be distributed at a discrete location in the supply chain. Each of the components may include a distributed ledger (blockchain) identification (ID) for identifying the component to a blockchain. Each of the components may further include at least two additional pieces of information selected from a group consisting of a serial number of the component, a date of manufacture of the component, a location of manufacture of the component, an ID associated with the source of the component, and/or the ID(s) of one or more subcomponent unit(s) of the component.

A database architecture may be utilized for administering the supply chain. Each of the blockchain IDs and the at least two additional pieces of information may be stored in the database architecture. In response to a determination that a unit is determined to be defective, the smart recall mechanism may post to the blockchain a recall or notice of the defect. Upon posting the recall or notice of defect to the blockchain, the method may include executing smart contract code that performs at least one of the following: transmitting a notice to all downstream manufacturers of the component and/or unit, transmitting a notice to a regulatory agency to implement safety procedures, and/or transmitting a recall notice to retailer(s) or customer(s) who have disclosed sale or purchase of the unit which contain the defective component.

The smart recall mechanism may include a private database supplier key can be associated with each component. The private database supplier key enables each component supplier to publish transactions associated with the recall or defect on to a blockchain. Each of the transactions preferably include the blockchain ID. The private database manufacturer key is associated with each component that forms part of a device associated with the manufacturer. The private database manufacturer key enables the manufacturer to review transactions associated with the recall or defect associated with components that form part of a device associated with the manufacturer.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Blockchain-Based Supply Chain Certification

Figure 1:
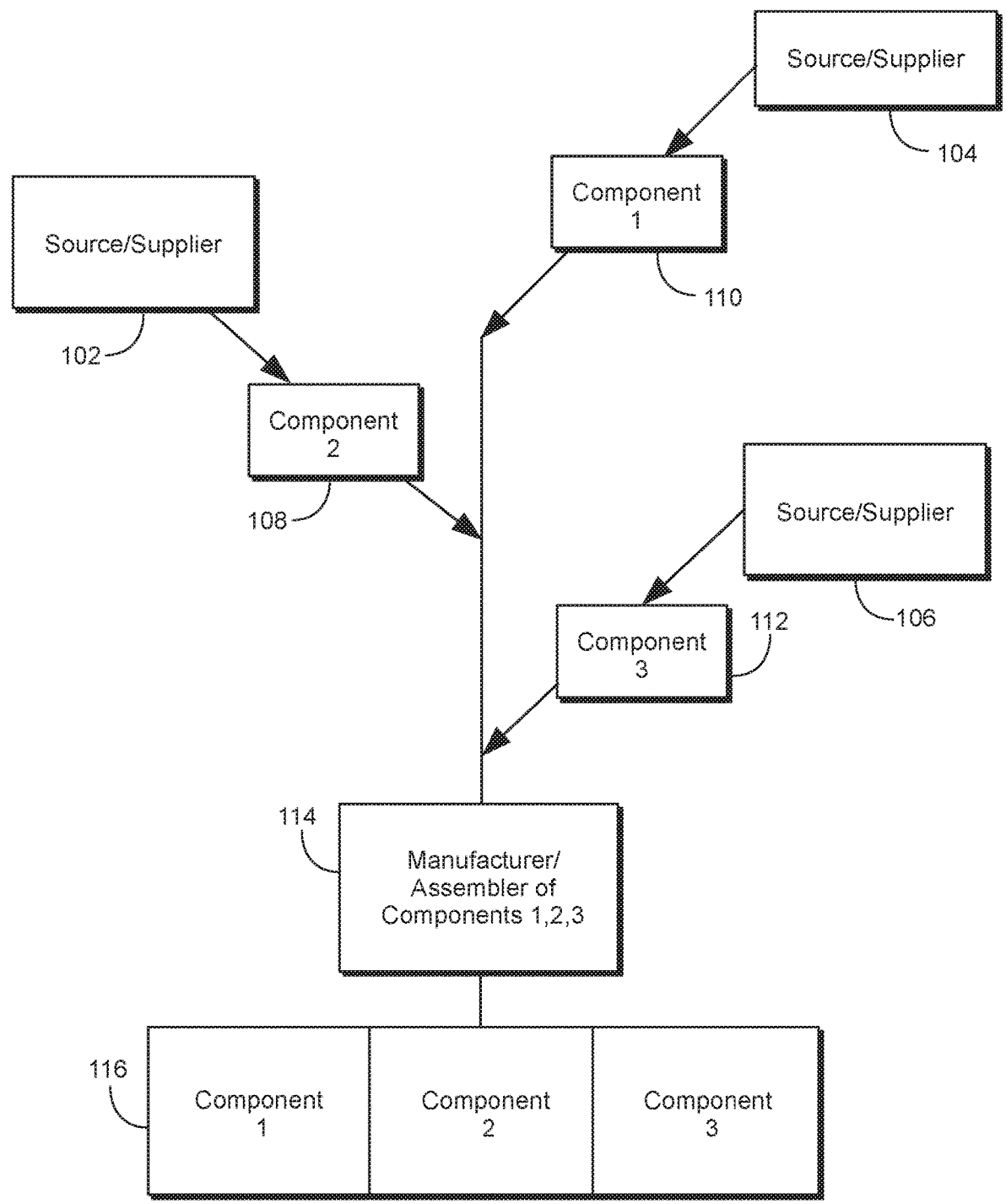
FIG. 1 shows a supply chain for use with certain embodiments of the invention.

As described above, a blockchain is a distributed ledger of records which contain information. Systems and methods according to certain embodiments operate by allowing authorized suppliers of critical components on a supply chain to record information about the component(s) on the blockchain. The blockchain may preferably enable component-level manufacturers with a private key to publish transactions through a wallet-like interface to the blockchain.

Information regarding a component(s) may be tied to a specific unit, for example where the unit is identified by a serial number. A serial number may be etched or printed onto the unit, or stored as an electronic SN in a read-only memory chip. Other means of component identification may include specific sequences of nucleotides in a DNA or RNA fragment encapsulated into the device body (e.g., in micro or nano-beads), or radioactively-tagged molecules.

It is within the scope of the embodiments disclosed herein that, where it is not practical to identify components or units with a serial number or other form of ID, the "handoff" or transfer of a component or unit (or batch of units) from a supplier-manufacturer to a receiver-manufacturer and incorporation of that unit into a unit assembly by the receiver-manufacturer can be "confirmed" by a transaction requiring agreement and joint-participation by the supplier and receiver.

Such a confirmation may preferably shift, at least in part, the responsibility for identifying the unit from the supplier-manufacturer to the receiving-manufacturer. This confirmation may be especially possible where the supplier-manufacturer is providing a single unit that is incorporated into a single unit-assembly which can be uniquely identified. Alternatively, the supplier-manufacturer may provide a batch of units (preferably manufactured under identical conditions) which may or may not be incorporated into final assemblies.

In certain embodiments, significant information about the unit(s) posted to the blockchain can include one more than one of:

The ID of the unit (the identifier on the blockchain);
The serial number of the unit (or some other identifier which may apply to the discrete component or unit or at a batch level for multiple units preferably fabricated together under identical conditions);
The date of manufacture;
The location of manufacture;
The ID of the manufacturer; and
The IDs of one or more subcomponent units.

In certain embodiments, supplier-manufacturers or receiver-manufacturers may submit entries to the blockchain which would be maintained in a distributed manner by at least some of the participants on the blockchain. Such participants may include government regulatory agencies, consumer protection groups, etc., manufacturing consortium members or other suitable entities. A manufacturing verification process may leverage proof-of-work or proof-of-stake, or some hybrid scheme which is trusted to result in trustless verification of the entry (or block of entries) submitted to the blockchain. In this way the provenance (source and/or source information) of a unit or unit assembly can be traced by anyone with read access to the blockchain.

Blockchain-Based Smart Recall

Using a system as described herein, a blockchain-based smart recall mechanism may be implemented. For example, if a unit is determined to be defective, a recall or notice of defect can be posted to the blockchain. In response to detection of a recall or notice of defect, a smart mechanism on the blockchain can recognize the posting of the defect notice (a triggering event) and execute smart contract code that executes one more steps to be performed. The steps may include an automated notice to all downstream manufacturers, notice to a regulatory agency to implement safety procedures, notices to retailers or customers who have disclosed sale or purchase of the unit or unit assemblies which contain the defective unit, and/or payment into an escrow account of funds that are set aside to compensate harmed parties or otherwise mitigate the consequences of the defect.

In certain embodiments, a smart recall mechanism for triggering a recall of a manufactured unit is provided. The unit may be formed on a supply chain from a plurality of components. The supply chain may be formed from a plurality of component manufacturing sources. The plurality of components may be distributed at a discrete location in the supply chain.

Each of the components may include a distributed ledger (blockchain) identification (ID) for identifying the component to a blockchain. Each of the components may include at least two additional pieces of information selected from a group consisting of a serial number of the component, a date of manufacture of the component, a location of manufacture of the component, an ID associated with the source of the component, and/or the ID(s) of one or more subcomponent unit(s) of the component.

The smart recall mechanism may also include a database architecture for administering the supply chain. Each of the blockchain IDs and at least two additional pieces of information may be stored in the database architecture. In response to a determination that a unit is determined to be defective, the smart recall mechanism may post to the blockchain a recall or notice of the defect. Upon posting the recall or notice of defect to the blockchain, the smart recall mechanism may execute smart contract code that performs at least one of the following: transmitting a notice to all downstream manufacturers of the component and/or unit, transmitting a notice to a regulatory agency to implement safety procedures, and/or transmitting a recall notice to retailer(s) or customer(s) who have disclosed sale or purchase of the unit which contain the defective component.

The smart recall mechanism may also include a private database supplier key associated with each component. The private database supplier key may enable each component supplier to publish transactions associated with the recall or defect on to blockchain. Each of the transactions may include the blockchain ID.

The smart recall mechanism may also include a private database manufacturer key associated with each component that forms part of a device associated with the manufacturer. The private database manufacturer key enables the manufacturer to review transactions associated with the recall or defect associated with components that form part of a device associated with the manufacturer.

In certain embodiments, the privacy of the blockchain may be ensured by using one or more hashing algorithms. In one exemplary hashing algorithm for use with certain embodiments of the invention, a hash equation may be used as follows. In a use case of an IoT device, an identifier on a motherboard may be hashed by the hash equation to form a hash-ID for the motherboard (hash-IDmotherboard). An identifier on a CPU may be hashed by the hash equation to form a hash-id for the CPU (hash-IDCPU). The hash-IDmotherboard and the hash-idCPU may be combined to form a hash-IDcombinedmotherboardCPU.

The private database manufacturer key includes the hash equation. The private database supplier key may be used to write the information to be stored using the hash equation. Such information may include the hash-IDmotherboard and the hash-idCPU. The private database manufacturer key may have access to the information stored in the blockchain because the private database manufacturer key can be used in combination with the hash equation.

While the foregoing represents one type of hashing for use with a blockchain according to certain embodiments, it should be understood that any suitable algorithm for encrypting the private database supplier key such that a holder of the private database supplier key can preferably have write (and/or read) access to the database and/or blockchain is within the scope of the present invention. It should further be understood that any suitable algorithm for encrypting the private database manufacturer key such that a holder of the private database manufacturer key can preferably have read (and/or write) access from the blockchain and/or the database is also within the scope of the present invention.

In certain embodiments, a transaction associated with a single component includes a plurality of subcomponents used to form the single component. In some embodiments, each of the subcomponents may be sourced from, and thereby related to, a different supplier.

In some embodiments, a serial number of each component (or subcomponent) may be etched in, printed on, or affixed to a tag which forms part of, or is attached to, or stored as an electronic serial number within, the component. In certain embodiments, the serial number of each component may include one of a specific sequence of nucleotides in a DNA or an RNA fragment encapsulated in the component in a micro-bead format or nano-bead format. In other embodiments, and the serial number of each component may include radioactively-tagged molecules held or otherwise stored within the component.

It should be noted that the provenance of a component may be traceable by any entity having a private database manufacturer key associated with the component. However, possession of a private database supplier key may not necessarily ensure that the party in possession of the private database supplier key can read from the blockchain. The provenance of a component may preferably include the serial number of the component, a date of manufacture of the component, a location of manufacture of the component, an ID associated with the source of the component, and/or the ID(s) of one or more subcomponent unit(s) of the component.

In certain embodiments, the unit may be one of a plurality units. All of the plurality of units may preferably be formed under substantially identical manufacturing conditions. The plurality of units may preferably be referred to as a batch of units and may be identifiable by a single batch ID. Such embodiments may utilize database architecture for administering the supply chain. The batch of units may include a blockchain ID, and at least two additional pieces of information selected from a group consisting of a serial number of the batch, a location of manufacture of the batch, an ID associated with the source of the batch, and/or the ID(s) of one or more components of each unit in the batch. The blockchain ID and at least two additional pieces of information may be stored in the database architecture.

A private database supplier key may be associated with the batch. The private database supplier key enables publishing of batch transaction information associated with a batch transaction associated with the batch onto a blockchain. Each of the transactions may include the blockchain ID and at least two additional pieces of information. The batch transaction may include information relating to a transfer of control of the batch from the supplier to a receiver-manufacturer. The batch transaction information may be retrievable using a private database receiver-manufacturer key associated with each batch associated with the receiver-manufacturer. The private database manufacturer key enables the receiver-manufacturer to review transactions associated with associated with each batch associated with the receiver-manufacturer.

In some of the batch embodiments, each unit in the batch is physically connected, either directly or indirectly, to each other unit in the batch to form a single physical unit.

In some embodiments, the provenance of a batch may be traceable by any entity having a private database manufacturer key associated with the batch. In some embodiments, each unit in the batch may be formed under substantially identical manufacturing conditions. In certain embodiments, each unit in the batch may be formed under different manufacturing conditions.

Each unit of the plurality of units in a batch may include an identical group of subcomponents. In other embodiments, each unit of the plurality of units in a batch may include a different group of subcomponents.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a supply chain 100 for use with certain embodiments of the invention. Supply chain 100 may preferably include multiple sources/suppliers 102, 104 and 106. Each of sources/suppliers 102, 104 and 106 may preferably manufacturer or otherwise provide components 108, 110 and 112. Components 108, 110 and 112 may preferably be received by manufacturer/assembler of components 114.

Manufacturer/assembler of components 114 may preferably use components 108, 110 and 112 to form or otherwise assemble unit 116.

Figure 2:
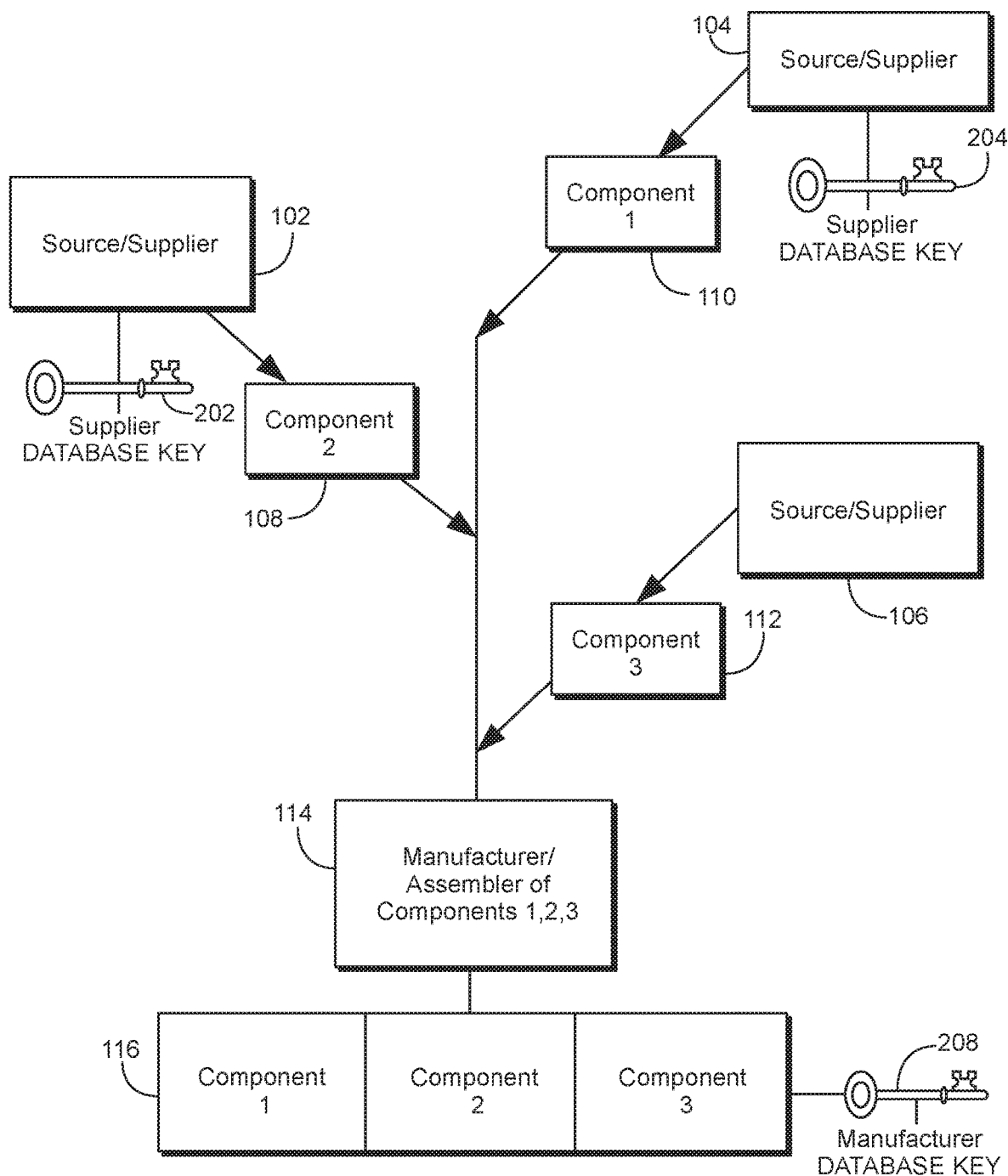
FIG. 2 shows a supply chain for use with certain keys for accessing a blockchain according to certain embodiments.

In addition to the elements shown in FIG. 1, FIG. 2 shows a supply chain for use with certain keys for accessing a blockchain according to certain embodiments. Specifically, FIG. 2 shows supplier database keys 202, 204 and 206.

FIG. 2 also shows manufacturer database key 208. In one embodiment, supplier database keys 202, 204 and 206 may be configured to hold store a hash equation. A hash equation—commonly referred to as a cryptographic hash function—takes one input and calculates one output. The output bears no obvious relationship to the input. For this reason the hash function is often called a "one way" hash function.

Manufacturer database key 208 may be configured to store the hash equation. The hash equation may be used to form a hash value that can only be accessed by the supplier database key and the manufacturer database key with respect to the information relative to each. To the extent the supplier database key is needed to write certain information to a blockchain and the manufacturer database key is needed to read certain information from the blockchain, the keys may be limited to providing the necessary information.

Figure 3:
FIG. 3 shows a manufacturer's user interface (MUI) according to certain embodiments of the invention.

FIG. 3 shows a manufacturer's user interface 300 (MUI) according to certain embodiments of the invention. Interface 300 may preferably provide supplier information for each different component used to form a unit or unit assembly. Such information may include the blockchain ID associated with the component, the serial number, the date of manufacture, the location of manufacture, the identification of the source/supplier of the component and/or a list of component sub-units (subcomponents) associated with the component.

Figure 4:
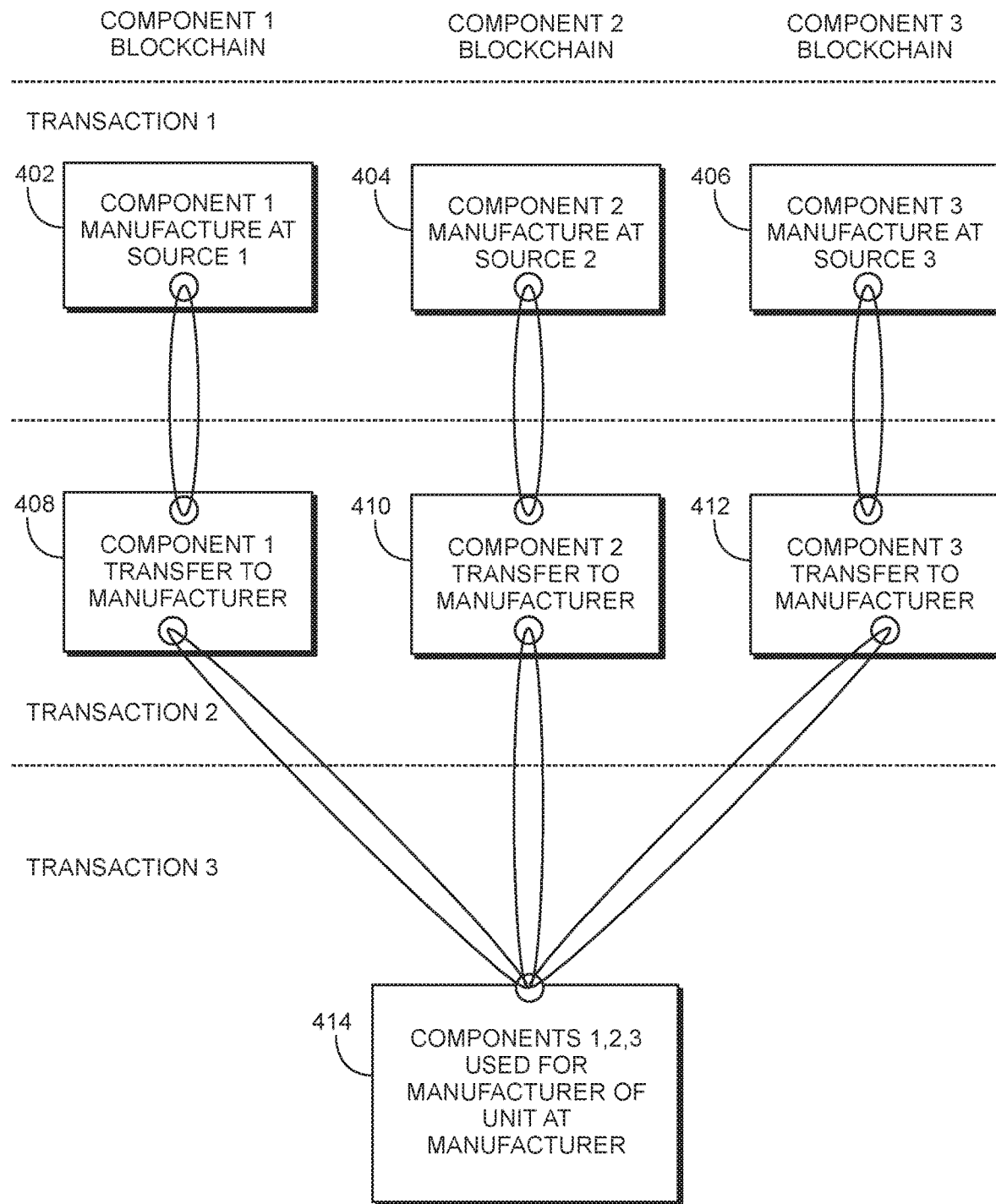
FIG. 4 shows a representative illustration of an exemplary blockchain according to certain embodiments.

FIG. 4 shows a representative illustration of an exemplary blockchain 400 according to certain embodiments. Blockchain 400 preferably includes individual blockchains that represent the supply chains for each of representative components 1, 2 and 3.

A single transaction represents each stage of blockchain 400. For example, transaction 1 shows manufacture of the individual components at their respective sources, as shown at 402, 404 and 406. Transaction 2 shows transfer of the individual components from their respective sources to the manufacturer of units, as shown at 408, 410 and 412.

At the termination, transaction 3 shows unit manufacture at 414. Unit manufacture at 414 shows the culmination of the unit manufacturer at 414 which utilizes each of components 1, 2 and 3. It should be noted that the permissions granted to write to and/or read from blockchain 400 may configured so as to enable the unit manufacturer to quickly and easily trace manufacturing defects at the component (or subcomponent) level and/or other suitable manufacturing issues.

Figure 5:
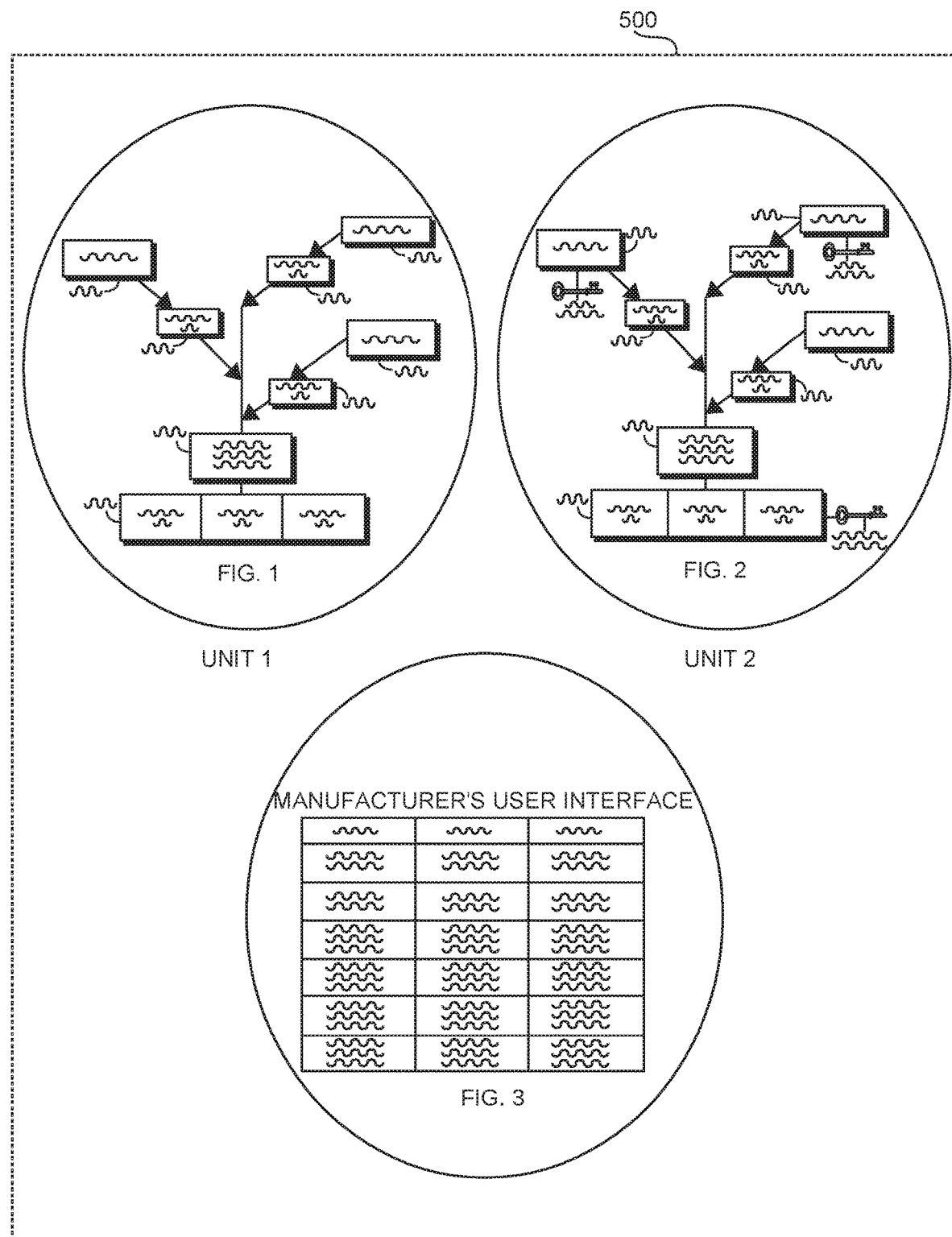
FIG. 5 shows a representative illustration of a supply chain for use in constructing similar components of a unit.

FIG. 5 shows a representative illustration 500 of preferably identical, and possibly redundant, supply chain for use in constructing similar components of a unit. It should be noted that each of units 1 (indicated by element number 502) and 2 (indicated by element number 504) may preferably be formed under substantially identical manufacturing conditions. Such units may preferably be analyzed and/or researched as a batch.

FIG. 5 shows interface 506. Interface 506 may preferably indicate the information derived from supply chains 502 and 504.

Figure 6:
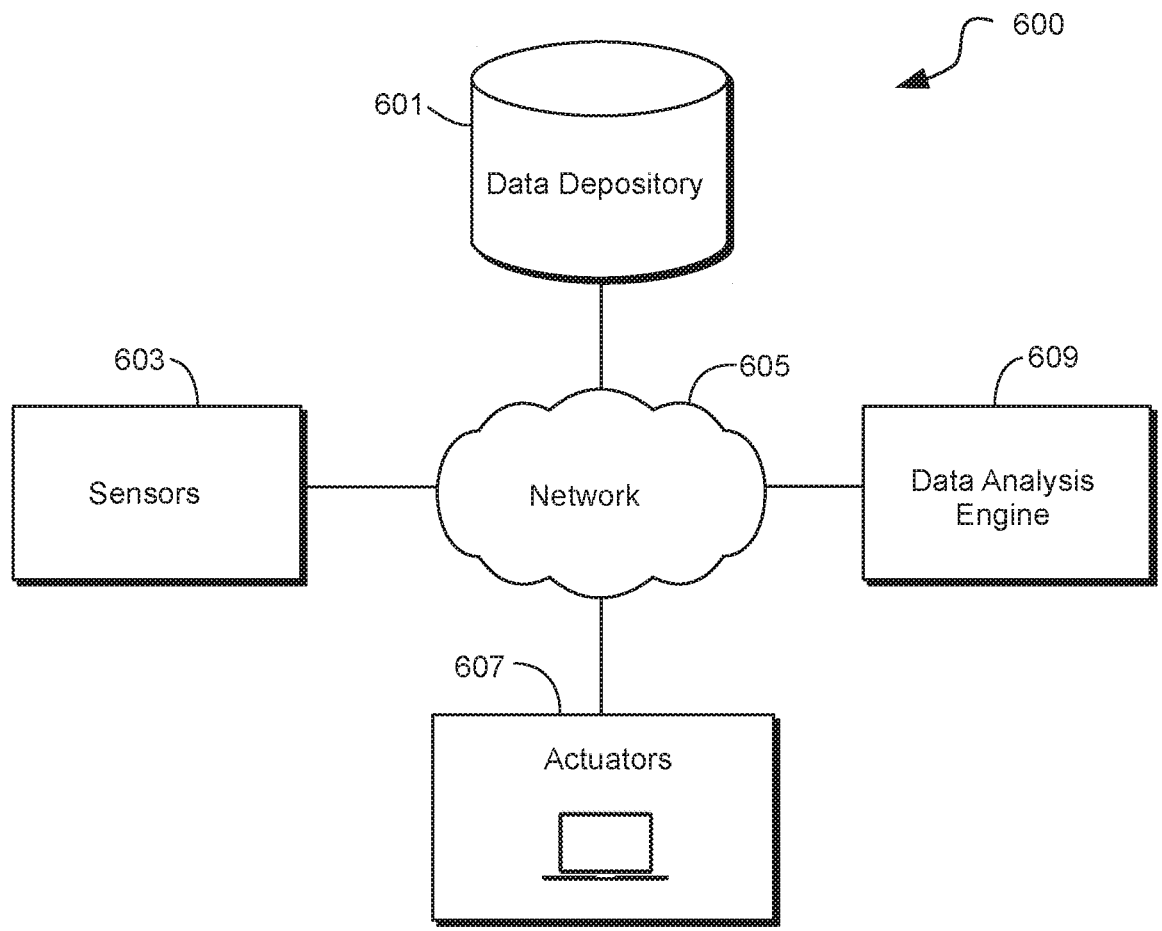
FIG. 6 shows an embodiment of an illustrative system architecture.

FIG. 6 shows illustrative system architecture 600. Architecture 600 may represent an internet of things ("IoT"). In certain embodiments, the subcomponents, components, and/or units may include devices that are used in, or form part of, the IoT. The foregoing supply-chain-related disclosure, when used in conjunction with manufacture of IoT devices, may increase security associated with an IoT user-network formed from the devices. Specifically, additional blockchain information, including provenance information, related to the IoT devices may be used to identify network and validate IoT devices.

A relevant differentiator between IoT networks and conventional networks is a traffic profile. In an IoT, nodes may not have defined or known network positions, communication protocols or security services. Solutions that allow architecture 600 to function seamlessly and leverage such disparate components, especially in the context of blockchain identification, are disclosed herein.

Architecture 600 may include nodes. Each node may represent an IoT device for which provenance is known. Each node may include two or more nodes. FIG. 6 shows exemplary nodes 601, 603, 605, 607 and 609. The architecture includes sensors 603. Sensors 603 may include devices that detect changes in a physical or virtual environment. For example, sensors may measure audio, rainfall, temperature or water levels. Sensors may measure electronic network traffic, electronic signals (e.g., input or output) or frequency of user logins from within a predefined geographic area.

Sensors may be any suitable size. For example, sensors may be a few millimeters in size. Sensors may be deployed in a wide variety of locations. For example, sensors may be deployed in military battlefields, industrial plants, in orchards, in clothing, automobiles, smart phones, jewelry or refrigerators. Sensors may be relatively inexpensive and have low energy consumption. Sensors may "sense" two or more stimuli or environmental changes.

Captured data may be transmitted using any suitable transmission method. For example, data captured by a sensor may be extracted by a mobile phone. Sensors may leverage a communication link provided by a mobile phone to communicate captured data to another node.

Each sensor may be a node and each sensor may be assigned a unique identifier (ID). The unique ID may be the same or different from the blockchain identifier set forth above. For example, sensors may be identified by one or more radio frequency identification ("RFID") tags. The RFID tag may be stimulated to transmit identity information about the sensor or any other information stored on the RFID tag.

Captured data may be transmitted by the sensor and processed far from the location of the sensor that captured the data. For example, captured data may be transmitted from one node to another node until the captured data reaches data repository 601.

Sensors maybe positioned and capture data from diverse locations. Locations may include geographic locations or virtual locations on electronic networks. Captured data may be transmitted to a location where information is needed for decisioning or consumption, which may not be the same place the data was captured or generated. Data synchronization protocols and caching techniques may be deployed to ensure availability of information at, or delivery to, a desired node. For example, a location where data is captured may not have continuous reliable network connectivity. Accordingly, captured data may be stored locally on the sensor for an amount of time prior to transmission or broadcast to another node.

Contextually, captured data may provide information not only about the physical environment surrounding a sensor, but the capturing of data from multiple sensors may provide data that signifies an event. Sensors may be grouped. Sensors may be grouped based on physical proximity or based on the content (or expected content) of data captured. Sensors may be grouped virtually. Other nodes, such as data analysis engine 109 may create and/or be included in such groups. In some embodiments, the captured data may be organized by data repository 601.

Based on data captured from sensors 603, actuators 607 may respond to a detected event. Based on the capture and analysis of multiple sources of data, actuators 607 may be instructed to take action without human intervention.

Generally, sensors and other nodes that form part of architecture 600 may include a processor circuit. The processor circuit may control overall operation of a node and its associated components. A processor circuit may include hardware, such as one or more integrated circuits that form a chipset. The hardware may include digital or analog logic circuitry configured to perform any suitable operation.

A processor circuit may include one or more of the following components: I/O circuitry, which may include a transmitter device and a receiver device and may interface with fiber optic cable, coaxial cable, telephone lines, wireless devices, PHY layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

Machine-readable memory may be configured to store, in machine-readable data structures: captured data, electronic signatures of biometric features or any other suitable information or data structures. Components of a processor circuit may be coupled together by a system bus, wirelessly or by other interconnections and may be present on one or more circuit boards. In some embodiments, the components may be integrated into a single chip. The chip may be silicon-based.

The node may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor for enabling a node to perform various functions. For example, the non-transitory memory may store software applications used by a node, such as an operating system, application programs, and an associated database. Alternatively, some or all of computer executable instructions of a node may be embodied in hardware or firmware components of the node.

Software application programs, which may be used by a node, may include computer executable instructions for invoking user functionality related to communication, such as email, short message service ("SMS"), and voice input and speech recognition applications. Software application programs may utilize one or more algorithms that request alerts, process received executable instructions, perform power management routines or other suitable tasks.

As shown in FIG. 6, a node may operate in a networked environment. A node may be part of two or more networks. A node may support establishing network connections to one or more remote nodes. Such remote nodes may be sensors, actuators or other computing devices. Nodes may be personal computers or servers. Network connections may include a local area network ("LAN") and a wide area network ("WAN"), and may also include other networks. When used in a LAN networking environment, a node may be connected to the LAN through a network interface or adapter. The communication circuit may include the network interface or adapter.

When used in a WAN networking environment, a node may include a modem or other circuitry for establishing communications over a WAN, such as the Internet. The communication circuit may include the modem.

The existence of any of various well-known protocols such as TCP/IP, Ethernet, FTP, HTTP and the like is presumed, and a node can be operated in a client-server configuration to permit a user to retrieve web pages from a web-based server. Web browsers can be used to display and manipulate data on web pages.

Nodes may include various other components, such as a battery, speaker, and antennas. Network nodes may be portable devices such as a laptop, tablet, smartphone, "smart" devices (e.g., watches, eyeglasses, clothing having embedded electronic circuitry) or any other suitable device for receiving, storing, transmitting and/or displaying relevant information. Blockchains according to certain embodiments may include provenance information for the components and/or for the IoT units themselves.

A node may include a display constructed using organic light emitting diode ("OLED") technology. OLED technology may enhance functionality of a node. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a Liquid Crystal Display power must be supplied to the entire backlight, even to illuminate just one pixel in the display. In contrast, an OLED display does not necessarily include a backlight. Furthermore, in an OLED display, preferably, only the illuminated pixel draws power.

The power efficiency of OLED technology presents a possibility for designing nodes that provide enhanced security and functionality. Illustrative devices that may be constructed using OLED technology are disclosed in U.S. Pat. No. 9,665,818, which is hereby incorporated by reference herein in its entirety.

A node may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

Nodes may utilize computer-executable instructions, such as program modules, being executed by a computer. Generally, program modules include routines, programs, objects, components, data structures, etc. that perform particular tasks or implement particular abstract data types. A node may be operational with distributed computing environments where tasks are performed by remote processing devices that are linked through a communications network. In a distributed computing environment, program modules may be located in both local and remote computer storage media including memory storage devices. Nodes may rely on a network of remote servers hosted on the Internet to store, manage, and process data (e.g., "cloud computing"). Nodes may also be identified with a blockchain ID.

Nodes may include a battery. The battery may be a power source for electronic components of the node. For example, the battery may supply power to the display, the communication circuit and the processor circuit. In some embodiments, a node may include a plurality of batteries. Nodes may include solar panels that convert solar energy into electricity that powers one or more components of a node.

Sensors in a single architecture or other grouping may be produced by different manufacturers. Sensors may capture data in different formats. For example, sensors may use different data structures to package captured data. Sensors 603 may utilize different communication protocols to transmit captured data or communicate with other nodes. Despite such operational differences, sensors 603 may operate substantially seamlessly together. Interoperability may allow captured data to be substantially seamlessly captured and interpreted by data analysis engine 609. Based on interpreting the captured data, data analysis engine 609 may issue instructions to actuators 607.

Interoperability may be implemented across any suitable nodes of architecture 600. Interoperability may enable communication between sensors 603 and other nodes. Interoperability may enable architecture 600 to provide services and applications via actuators 607. Interoperability may allow services and content to be provided anywhere, anytime and based on input/output of different nodes.

Data gathering by one or more of sensors 603 may be controlled by one or more other nodes of architecture 600.

For example, data analysis engine 609 may control a quantity of data captured by sensors 603. Alternatively, data repository 601 and/or analysis engine 609 may filter or otherwise intelligently process data captured by sensors 603.

Timing of when data is captured by sensors 603 may be controlled by any suitable node on architecture 600. For example, data may be captured in real-time or at pre-defined intervals such as once a day. Data may also be captured in response to a detected environmental status change.

Data analysis engine 609 may filter data captured by sensors 603. Data analysis engine 603 may repackage or reformat captured data. Data conversion may include transformation of low level raw data (possibly from multiple sensors or groups of sensors) into meaningful information for a target audience or for a target analysis.

For example, captured data intended for human consumption or interaction may be converted into a human understandable format. Captured data intended for machine consumption may be converted into a format readable by a particular machine or node.

Data analysis engine 609 may perform pattern recognition to identify correlations and trends in captured data. Data analysis engine 609 may also evaluate a cost of obtaining data. "Costs" may be monetary (e.g., labor costs or infrastructure costs), time-related or related to a level of intrusion needed to obtain desired data. "Costs" may be bandwidth-related.

For example, a communication link may be associated with a fixed bandwidth. The bandwidth may limit an amount of information or a rate of transmission over the communication link.

For example, a sensor may respond slowly to a request from another node if there is a large amount of informational traffic traveling on a communication link shared with other nodes. The large amount of informational traffic may not leave sufficient bandwidth for the transmitting node to timely communicate with the requesting node.

As a further example, a sensor may respond slowly if the sensor transmits a large amount of captured data. The large amount of information transmitted by the sensor, together with other informational traffic traveling on the shared communication link, may be close to, or exceed the bandwidth of the communication link. As a result, sensors may be unable to transmit captured date in a timely manner.

Data travelling within architecture 600 to/from nodes may be routed along multiple communication links until the transmitted information reaches a desired destination node (e.g., data analysis engine 609). Each communication link may service a number of connected nodes and a respective volume of informational traffic.

It may be difficult to ascertain available bandwidth on a particular communication link. It may be difficult to ascertain which communication links are being utilized to transmit information between nodes. Nodes attempting to transmit information over a communication link may not be aware of a number of connected nodes, a volume of traffic on a particular communication link or a bandwidth capacity of a communication link.

Furthermore, a communication link may be controlled by a different entity from an entity responsible for operation of a particular node. The entity responsible for operation of the node may be unable to monitor a number of nodes that share a communication link, a bandwidth capacity of a communication link or a volume of traffic transmitted on a communication link. Despite difficult to predict conditions on a communication link, it would be desirable for a node to timely respond to a request for information or timely receive desired information.

Sensors 603 may belong to, or operated by, different administrative/management domains. Sensors 603 may be operated by different domains without expressly-defined relationships among such domains. The absence of express relationships enables preferably key-based access to data captured by sensors 603 by one or more architectures having one or more features in common with architecture 600. Groups of sensors may include sensors from two or more administrative domains.

Data repository 601 may receive data captured by sensors 603. In some embodiments, data captured by sensors 603 may be transmitted directly to data analysis engine 609. Data stored in repository 601 may be sorted and analyzed by data analysis engine 609. Data stored in data repository 601 may be so voluminous and complex (e.g., structured/unstructured and/or constantly changing) that traditional data processing application software may be inadequate to meaningfully process the data (e.g., "big data"). Data analysis engine 609 may include software applications specially designed to process large volumes of data ("big data analytics").

Based on captured data, data analysis engine 609 may optimize processes, reduce loss (e.g., fraud), improve customer understanding and targeting, increase automation, decrease latency in products and/or services provided by actuators 607 and identify new analytical models that may utilize data captured by sensors 603.

Architecture 600 may include one or more layers of software applications. Software applications may implement a variety of functions and provide varied services to nodes of architecture 600. Software applications running on data analysis engine 609 may submit requests to sensors 603 for retrieval of specific data to achieve a functional goal provided by actuators 607. Software applications may control data captured by sensors 603 or actions taken by actuators 607. Software applications may control a flow of information within architecture 600.

Software applications may be implemented on a node. A node may be an enterprise system or a "cloud" of computing devices. On device applications may be dependent on a specific hardware configuration. Such hardware requirements may preferably be minimal, such as an extension of the OS/firmware of the device. For example, illustrative software applications for sensors may include TinyOS, Linux, Contiki and RIOT.

Software applications may include middleware. Middleware may connect an operating system or database to other software applications. Middleware may configure and manage hardware such as sensors (e.g., to achieve a target functionality). Middleware may be responsible for aggregating data captured by sensors 603 and passing captured data to data repository 601 and/or data analysis engine 609.

Software applications may provide security services that mitigate threats to the integrity of data captured by sensors 603 or architecture 600 generally.

Actuators 607 may respond to data transmitted or processed by other nodes such as data analysis engine 609. Actuators 607 may include devices that modify the physical state of a physical entity. Actuators 607 may include devices that modify a virtual state of information. For example, actuators 607 may move (translate, rotate, etc.) physical objects or activate/deactivate functionalities of more complex ones. An actuator may dim a light bulb, open a door, change a temperature setting, authorize access to an automated-teller-machine ("ATM") and/or any other suitable functionality. Actuators 607 may verify identities, trigger electronic payments, extend credit or debit accounts.

Within an intelligent networked system such as architecture 600, sensors 603 perform the functions of input devices—they serve as, for example, "eyes," collecting information about their environment. In contrast, actuators 607 act as "hands," implementing decisions based on data captured by sensors 603. A single node may include the functions of sensors and actuators.

Actuators 607 may communicate with data analysis engine 609 and sensors 603. Actuators 607 may include an application programming interface ("API") for communicating with other nodes. Actuators 607 may communicate directly with other nodes using machine-to-machine ("M2M") protocols. Illustrative M2M protocols may include MQ Telemetry Transport ("MQTT"). M2M includes communication between two or more objects without requiring direct human intervention. M2M communications may automate decision-making and communication processes for actuators 607.

In the absence of express relationships between sensors and the devices that access data captured by the sensors, traditional approaches for managing trust, security naming, discovery, or other traditional network services may not be applicable or available. In one particular embodiment, the blockchain system disclosed herein for identifying, maintaining and providing information regarding a manufactured device, such as an IoT device, may be used for managing trust of the IoT devices in the network.

Generally, nodes of architecture 600 may interact and cooperate using one or more interaction paradigms. Exemplary interaction paradigms include client-server and peer-to-peer interactions.

As a result of the disparate nature of sensors 603, an architecture, such as architecture 600 incorporating sensors 603 may support a variety of communication protocols. Illustrative supported protocols may include HyperText Transfer Protocol ("HTTP"), Simple Object Access Protocol ("SOAP"), REpresentational State Transfer ("REST") Constrained Application Protocol ("CoAP"), SensorML, Institute of Electrical and Electronic Engineers ("IEEE") 802.15.4 ("ZigBee") based protocols, IEEE 802.11 based protocols. For example, ZigBee is particularly useful for low-power transmission and requires approximately 20 to 60 mW for 1 mW transmission power over a range of 10 to 100 meters and a data transmission rate of 250 kbit/s.

To further conserve energy, a sensor may communicate wirelessly for short periods of time. Utilizing this approach, one or more standard size single cell cylindrical dry battery batteries (e.g., AA size) may provide requisite computing power and wireless communication for many months.

Communication protocols used by nodes (e.g., sensors or actuators) may not have, or may not be capable of having, security capabilities. A security layer or buffer may be implemented by nodes that receive or rely on data captured by insecure sensors. Sensors or other nodes may be dynamically connected or disconnected from a group or architecture. A security layer or buffer may be modular and quickly scalable meet growth/contraction requirements.

A physical layer may physically link nodes of architecture 600. The physical layer may provide communication pathways or links to move data between multiple sub-networks and nodes. Such communication links may be wired or wireless. Exemplary wireless communication links may include Bluetooth, Wi-Fi, 3G, 4G, 5G and LTE.

Figure 7:
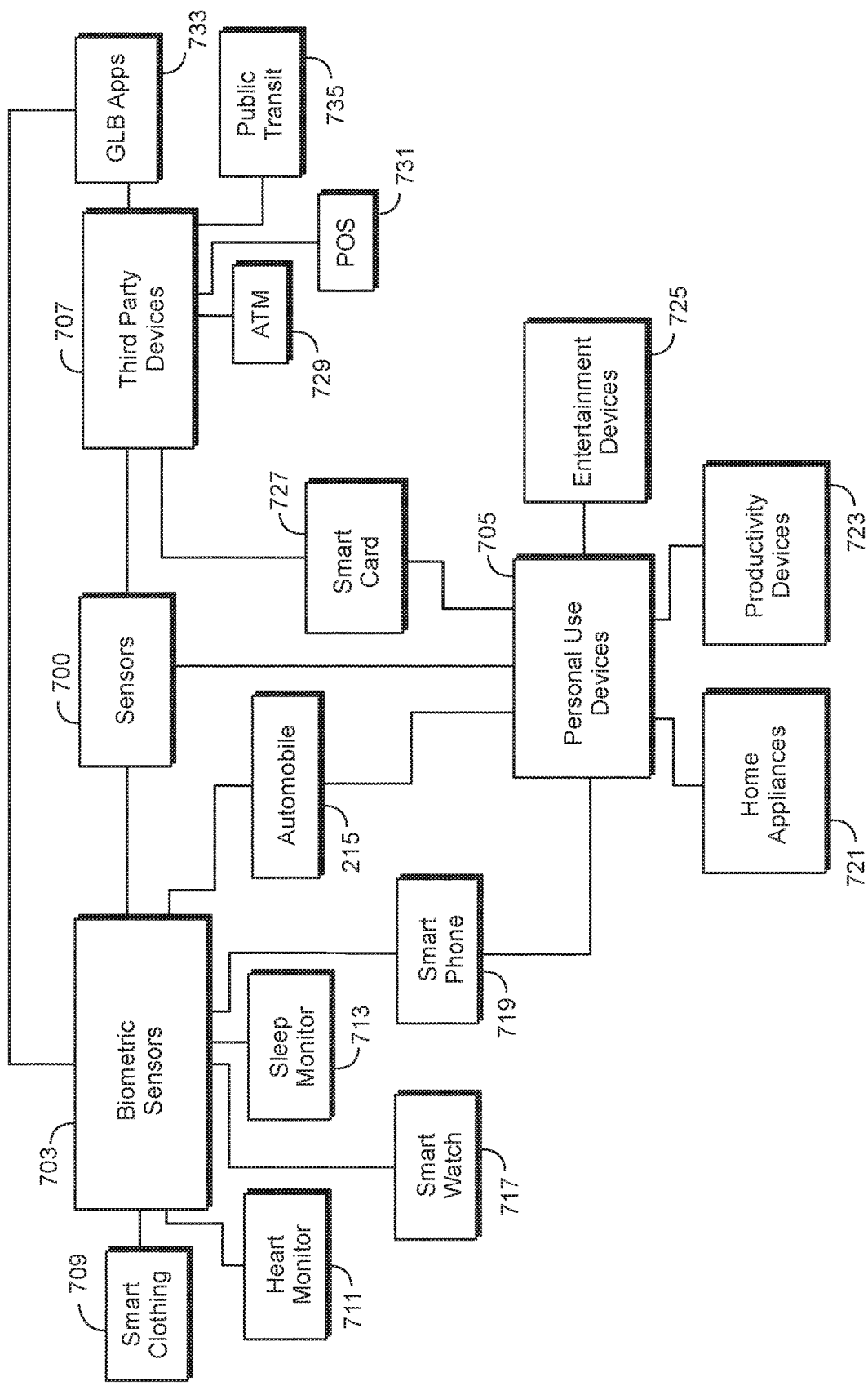
FIG. 7 shows embodiments of illustrative sensors for use with embodiments of the invention.

FIG. 7 shows illustrative sensors 700. Sensors 700 may include or more features of sensors 603 (shown in FIG. 6).

Sensors 700 include biometric sensors 703 that sense biometric attributes. For example, biometric sensors may be embedded in IoT devices such as "smart" clothing 709 that monitors a wearer's physical condition. Such clothing may capture biometric data, such as pulse rate, temperature, perspiration levels, muscle contraction, heart rhythm and/or physical movement. Smart clothing may be linked to smart phone 719 such as via a Bluetooth® communication link. Smart phone 719 may transmit data captured by smart clothing 709 to one or more other network nodes.

Biometric sensors 703 may include other illustrative sensors such as heart monitor 711, sleep monitor 713, smart watch 719, smart phone 719 and automobile 715.

Sensors 700 may include personal use devices 705. Personal use devices 705 may include sensors embedded in home appliances 721, productivity devices 723 or entertainment devices 725. Productivity devices 723 may include tablets, laptops or other personal computing devices. Entertainment devices may include gaming consoles and the like.

Sensors 700 also include third-party devices 707. Third-party devices may include devices that are not under the direct or exclusive control of a user or whose use is monitored by a third-party. A user may interact with third-party devices 707 to obtain a desired service provided by the third-party.

Exemplary third party devices include smart card 727. Smart card 727 may function as a purchasing instrument. Illustrative purchasing instruments may conform to specifications published by the International Organization for Standardization. Such specifications may include: ISO/IEC 7810, ISO/IEC 7811 and ISO/IEC 7816, which are hereby incorporated herein by reference in their entireties. Suitable purchasing instruments may include a credit card, debit card and other electronic purchasing devices. Such purchasing instruments may sense a location or frequency of use.

Purchasing instruments may include "EMV" chips. EMV is a technology that derives its name from the companies (Europay, MasterCard, and Visa) that helped develop the technology. When the credit card and its associated EMV chip are inserted into a specialized card reader such as point-of-sale terminal ("POS") 731, the reader powers the EMV chip and the EMV chip generates a new authorization code each time the credit card is used. The EMV chip may capture transaction data such as amounts, location or identity of the POS.

Third-party sensors 707 may include ATM 729, POS 731 and public transit 735. ATM 729 and POS 731 may also be actuators. Third-party devices may also include software applications 733. Applications 733 may be used to access services, such as an online banking portal ("OLB"). Such applications may detect biometric features submitted to authorize access to an OLB. Third-party devices may include sensors that capture data associated with power consumption (e.g., smart grids), electronic communication traffic, logistics (package movement) or any other suitable environmental condition.

FIG. 700 shows that sensors may categorically overlap. For example, an application used to access an OLB may capture a biometric feature (e.g., fingerprint) to authenticate a user. Automobile 715 may be in regular communication with a third-party.

Each of the sensors shown in FIG. 700 may include different and possibly incompatible hardware. For example, sensors may each have different operating systems (or none at all), processor types and memory requirements. Sensors 700 may be inexpensive, single-function devices with rudimentary network connectivity. Sensors 700 may be positioned in remote and/or inaccessible locations where human intervention or configuration is difficult.

To conserve power, sensors 700 may utilize 16-bit microcontrollers. Such microcontrollers may use less than 400 µW per MIPS ("million instructions per second") yet may be capable of operating TCP/IPv6 stacks with 4 kB RAM and 24 kB flash memory. As outlined in proposed Internet standard RFC 4944, which is hereby incorporated by reference in its entirety, IPv6 may be implemented over IEEE 802.15.4 (e.g., ZigBee) based wireless communication protocols or other suitable communication protocols.

Furthermore, because of potentially disparate features and characteristics of sensors 700, security solutions disclosed herein may be used to verify an authenticity of a sensor and/or data transmitted by the sensor.

Thus, apparatus and methods for a blockchain-based supply chain certification are provided. Some embodiments may include a blockchain certified supply chain for IoT devices. Persons skilled in the art will appreciate that the present invention can be practiced by other than the described embodiments, which are presented for purposes of illustration rather than of limitation. The present invention is limited only by the claims that follow.

What is claimed is:

1. A smart recall method for executing a recall of a manufactured unit, the unit formed on a supply chain from a plurality of components, the supply chain formed from a plurality of component manufacturing sources, said plurality of components distributed at a discrete location in the supply chain, each of said components comprising a distributed ledger (blockchain) identification (ID) for identifying the component to a blockchain, and at least two additional pieces of information selected from a group consisting of a serial number of the component, a date of manufacture of the component, a location of manufacture of the component, an ID associated with the source of the component, and/or the ID(s) of one or more unit(s) subcomponents of the component, the smart recall method comprising:

storing, in a database architecture for administering the supply chain, each of the blockchain IDs and the at least two additional pieces of information;

in response to a determination that the unit is determined comprise a defective component, posting to the blockchain a recall or notice of the defect, the call or notice comprising the blockchain ID for the defective component;

in response posting the recall or notice of defect to the blockchain, executing smart contract code associated with the blockchain ID for the defective component, the smart contract code configured to:

transmit a notice to downstream manufacturers of the component and/or unit, the downstream manufacturers identified via a posted transaction comprising the blockchain ID for the defective component:

transmit a notice to a regulatory agency to implement safety procedures;

transmit a recall notice to retailer(s) or customer(s) who have disclosed sale or purchase of the unit which contain the defective component; and transfer funds into an escrow account for compensation or mitigation activities arising from the defective component;

generating a private database supplier key associated with each component, wherein the private database supplier key enables each component supplier to publish transactions associated with the recall or defect to the blockchain, each of said transactions comprising the blockchain ID; and generating a private database manufacturer key associated with each component, wherein the private database manufacturer key enables a manufacturer to review transactions associated with the recall or defect associated with components that form part of a device associated with the manufacturer.

2. The smart recall method of claim 1, wherein a transaction associated with a single component comprises a plurality of subcomponents, each of the subcomponents related to a different supplier.

3. The smart recall method of claim 1, wherein the serial number of each component is one of etched in, printed on, affixed to a tag which is attached to, or stored as an electronic serial number within, the component.

4. The smart recall method of claim 1, wherein the serial number of each component consists of one of, a specific sequence of nucleotides in a DNA or an RNA fragment encapsulated in the component in a micro-bead format or nano-bead format and radioactively-tagged molecules held within the component.

5. The smart recall method of claim 1, wherein a provenance of a component is traceable by any entity having the private database manufacturer key associated with the component.

6. The smart recall method of claim 1, wherein the unit is one of a plurality of units and all of the plurality of units are formed under identical manufacturing conditions.

7. The smart recall method of claim 6, wherein the plurality of units is identifiable by a single batch ID.

8. The smart recall method of claim 1, wherein the plurality of components comprises a plurality of Internet of Things (IoT) devices.

9. A smart recall method for executing a recall of a batch of manufactured units, the batch of manufactured units formed on a supply chain from a plurality of unit components, the supply chain formed from a plurality of unit manufacturing sources, each batch distributed at a discrete location in the supply chain, each batch comprising a distributed ledger (blockchain) identification (ID) for identifying the batch to a blockchain, and at least two additional pieces of information selected from a group consisting of a serial number of a component, a date of manufacture of the component, a location of manufacture of the component, an ID associated with the source of the component, and/or the ID(s) of one or more subcomponents of the component, the smart recall mechanism comprising:

storing in a database architecture for administering the supply chain, each of the blockchain IDs and the at least two additional pieces of information;

in response to a determination that the batch is defective, posting to the blockchain a recall of the batch or notice of the defect of the batch, the recall or notice of the defect comprising the blockchain ID for the batch;

upon posting the recall or notice of defect to the blockchain, executing smart contract code associated with the blockchain ID for the batch, the smart contract code: transmitting a notice to downstream manufacturers of the unit and/or batch, transmitting a notice to a regulatory agency to implement safety procedures, transmitting a recall notice to retailer(s) or customer(s) who have disclosed sale or purchase of the batch, and transferring funds into an escrow account for compensation or mitigation activities arising from the defective component;

generating a private database supplier key associated with each unit, wherein the private database supplier key enables each unit supplier to publish transactions associated with the recall or defect to the blockchain, each of said transactions including the blockchain ID; and generating a private database manufacturer key associated with each unit that forms part of the batch associated with a manufacturer, the private database manufacturer key that enables the manufacturer to review transactions associated with the recall or defect associated with the batch.

10. The smart recall method of claim 9, wherein each unit in the batch is physically connected to form a single physical unit.

11. The smart recall method of claim 9, wherein the serial number of the batch is one of etched in, printed on, affixed to a tag which is attached to, or stored as an electronic serial number within, the batch.

12. The smart recall method of claim 9, wherein a provenance of a batch is traceable by any entity having a private database manufacturer key associated with the batch.

13. The smart recall method of claim 9, wherein each unit in the batch is formed under identical manufacturing conditions.

14. The smart recall method of claim 13, wherein each of the plurality of units comprises an identical group of subcomponents.

15. The smart recall method of claim 9, wherein the plurality of unit components comprises a plurality of Internet of Things (IoT) devices.

16. A method for executing a smart recall of a plurality of manufactured units, the unit formed from a plurality of unit components, a supply chain for the unit formed from a plurality of component manufacturing sources, the method comprising:

using a database architecture to administer the supply chain;

distributing each of the components at a discrete location in the supply chain;

assigning each of the components a distributed ledger (blockchain) identification (ID), and at least two additional pieces of information selected from a group consisting of a serial number of the component, a date of manufacture of the component, a location of manufacture of the component, an ID associated with the source of the component, and/or the ID(s) of one or more subcomponent unit(s) of the component, wherein each of the blockchain IDs and the at least two additional pieces of information are stored in the database architecture;

generating a private database supplier key associated with each component;

enabling, using the private database supplier key, each component supplier to publish transactions associated with the component onto a blockchain, each of said transactions comprising the blockchain ID and the at least two additional pieces of information;

generating a private database manufacturer key associated with each component that forms part of a device associated with the manufacturer;

enabling a manufacturer to review transactions associated with components that form part of a device associated with the manufacturer;

receiving a blockchain posting comprising a notice of defect or recall of one of the plurality of components the notice of defect or recall comprising the blockchain ID for the component;

in response to the notice or recall, executing smart contract code associated with the blockchain 11 for the component, the smart contract code:

transmitting a notice to downstream manufacturers of the component and/or unit, the downstream manufacturers identified via a posted transaction comprising the blockchain ID for the component;

transmitting a notice to a regulatory agency to implement safety procedures the component and/or unit;

transmitting a recall notice to retailer(s) or customer(s) the component and/or unit who have disclosed sale or purchase of the unit which contain the defective component; and transferrin funds into an escrow account for compensation or mitigation activities arising from the defective component.

17. The method of claim 16, wherein a transaction associated with a single component comprises a plurality of subcomponents, each of the subcomponents related to a different supplier.

18. The method of claim 16, further comprising etching the serial number in, printing the serial number on, affixing the serial number to, or electronically storing the serial number in each component.

19. The method of claim 16, wherein the serial number of each component consists of one of, a specific sequence of nucleotides in a DNA or an RNA fragment encapsulated in the component in a micro-bead format or nano-bead format and radioactively-tagged molecules held within the component.

20. The method of claim 16, wherein a provenance of the component is traceable by any entity having the private database manufacturer key associated with the component.

21. The method of claim 16, wherein the unit is one of a plurality of units and all of the plurality of units are formed under identical manufacturing conditions.

22. The method of claim 21, wherein the plurality of units is identifiable by a single batch ID.

23. The method of claim 16, wherein the plurality of unit components comprises a plurality of Internet of Things (IoT) devices.

* * * * *